United States Patent [19]

Medford

[11] Patent Number: 5,817,715
[45] Date of Patent: Oct. 6, 1998

[54] METHOD FOR MAKING CURABLE COATINGS

[75] Inventor: George Frederic Medford, Ballston Lake, N.Y.

[73] Assignee: General Electric Company, Waterford, N.Y.

[21] Appl. No.: 906,629

[22] Filed: Aug. 7, 1997

Related U.S. Application Data

[63] Continuation of Ser. No. 586,148, Jan. 11, 1996, abandoned, which is a continuation of Ser. No. 220,319, Mar. 30, 1994, abandoned, which is a division of Ser. No. 66,802, May 25, 1993.

[51] Int. Cl.$^6$ ....................................................... L08K 5/04
[52] U.S. Cl. ........................... 524/789; 514/558; 514/730; 514/731
[58] Field of Search ..................................... 524/789, 730, 524/731, 558

[56] References Cited

U.S. PATENT DOCUMENTS

| | | |
|---|---|---|
| 2,597,614 | 5/1952 | Brown et al. . |
| 3,258,477 | 6/1966 | Plueddemann et al. . |
| 4,021,310 | 5/1977 | Shimizu et al. . |
| 4,455,205 | 6/1984 | Olson et al. . |
| 4,478,876 | 10/1984 | Chung . |
| 4,486,504 | 12/1984 | Chung . |
| 4,491,508 | 1/1985 | Olson et al. . |
| 4,644,077 | 2/1987 | Gupta . |
| 4,709,067 | 11/1987 | Chu et al. . |
| 4,831,093 | 5/1989 | Swarts . |
| 4,877,654 | 10/1989 | Wilson . |
| 4,973,612 | 11/1990 | Cottington et al. . |
| 5,103,032 | 4/1992 | Turner et al. . |
| 5,120,811 | 6/1992 | Glotfelter et al. . |
| 5,242,719 | 9/1993 | Medford et al. . |

FOREIGN PATENT DOCUMENTS

| | | |
|---|---|---|
| 0424007 A2 | 4/1991 | European Pat. Off. . |
| 0437327 A2 | 7/1991 | European Pat. Off. . |
| 0576247 A2 | 12/1993 | European Pat. Off. . |

*Primary Examiner*—Bernard Lipman
*Attorney, Agent, or Firm*—Kenneth S. Wheelock

[57] ABSTRACT

A gel-free silica acrylate curable coating composition made from one or more of soluble salts, soaps, amines, nonionic and anion surfactants, acids or mixtures thereof, and a method for producing these compositions.

14 Claims, No Drawings

METHOD FOR MAKING CURABLE COATINGS

This is a continuation of Ser. No. 08/586,148 filed on Jan. 11, 1996 now abandoned which is a continuation of Ser. No. 08/220,319 filed on Mar. 30, 1994, now abandoned, which is a divisional of Ser. No. 08/066,802 filed on May 25, 1993.

BACKGROUND OF THE INVENTION

The present invention relates to curable coating compositions and to a method for producing curable gel-free coating compositions. More particularly the present invention relates to a gel-free silica acrylate curable coating composition.

Curable coating compositions based on silica acrylate resins are generally made using colloidal silica. It is desirable to produce a stripped coating by removing water from colloidal silica azeotropically, using a compatible solvent, for example isopropyl alcohol, and leaving the treated silica in a reactive acrylate carrier. It has been shown that when this reaction is run under a nitrogen atmosphere, a gel forms at a point during the stripping process when nearly all of the compatible solvent is removed. It is known that highly reactive acrylates require oxygen to prevent gelation, hence typically this stripping operation has been run under at least some oxygen. Due to the flammability of the compatible solvents, it is highly desirable to run these reactions without the addition of oxygen. Further, in the stripping vessels typically used, it is difficult to assure adequate oxygen dispersion. The method of the current invention, is a process for making gel-free curable coating compositions, without requiring the addition of oxygen to the system. Further, it has been found that coating compositions which are so stripped have exhibited longer shelf-lives.

The term gel-free refers to coating compositions in which viscosity is controlled within useful limits. The viscosity will of course vary depending on the specific polymers, however when the composition is diluted in a suitable solvent, essentially no undissolved material remains.

U.S. Pat. Nos. 4,486,504 and 4,455,205 relate to formulations of weatherable and non-weatherable UV curable hard coat compositions.

U.S. Pat. No. 4,973,612 to Cottington et al. relates to coating compositions which contain multifuntional acrylates, unsaturated organic compounds and aqueous dispersions of colloidal silica.

U.S. Pat. No. 4,644,077 to Gupta relates to a process for producing organophilic silica.

U.S. Pat. No. 4,491,508 to Olsen et al. relates to a method for making a solventless hard coat composition, which may be useful in the current invention.

U.S. Pat. No. 4,478,876 to Chung relates to a process of coating a substrate with an abrasion resistance ultraviolet curable composition. This process relates to forming the composition under a non-inert atmosphere such as air.

Generally, the above patents describe coatings which can be improved by use of the method of the current invention.

U.S. Pat. No. 5,120,811 to Glotfelter et al. relates to an organic/inorganic (epoxy/glass) wear surface coating over a clear, protective layer providing excellent stain and gloss protection. An acid hydrolyzed silicate is combined with an acid hydrolyzed silicone coupling agent, an epoxy monomer, a photoinitiator and silicon oil surfactant, but no colloidal silica or acrylate monomer is used.

U.S. Pat. No. 5,103,032 to Turner et al. relates to compositions containing an acryloxysilane or a methacryloxysilane and an N,N-dialkylaminomethylene phenol in an amount at least sufficient to inhibit polymerization of the silane during its formation, purification and storage, however, there is no mention of the use of colloidal silica.

U.S. Pat. No. 4,831,093 to Swarts relates to the polymerization of methyl methacrylate with initiator of perester salt of maleic acid using a bisulfite activator in water-in-oil emulsion, but does not contain $SiO_2$.

U.S. Pat. No. 4,780,555 to Bank relates to a method for preparing acryl-functional halosilanes by reacting a halosilane with an acryloxy or methacryloxy-functional organic compound in the presence of a platinum hydrosilation catalyst and a stabilizing amount phenothiazine, wherein the reaction mixture is contacted with an oxygen-cooing inert gas. No salt or surfactant is suggested for use as an compound.

U.S. Pat. No. 4,709,067 to Chu et al. relates to an improved process for preparing, purifying and/or storing methacryloxy or acryloxy containing organosilicon compounds without the undesirable polymerization normally associated with the methacrylate bonds. No salts or surfactants are suggested for inhibiting this polymerization, and the polymerization here is associated with methacrylate bonds.

U.S. Pat. No. 4,021,310 to Shimizu et al. relates to a method for inhibiting the polymerization of acrylic acid or acrylic esters during the distillation for separating or purifying the acrylic acid obtained by the vapor phase catalytic oxidation of propylene or acrolein, or the acrylic esters derived from said acrylic acid. There is no mention of colloidal silica, and the inhibited polymerization is that of acrylic acid or acrylic esters.

U.S. Pat. No. 3,258,477 to Plueddemann et al. relates to alkoxysilanes and compositions thereof, and fails to disclose the use of colloidal silica.

SUMMARY

The present invention is directed to a curable coating composition comprising a compound selected from the group consisting of soluble salts, soaps, amines, nonionic and anionic surfactants, acids, and bases and mixtures thereof, and to a method for making gel-free silica acrylate curable coating compositions, wherein such a compound is added to the reaction mixture before stripping.

DETAILED DESCRIPTION OF THE INVENTION

The curable coating compositions of the present invention are made from a gel-free silica acrylate curable coating composition comprising a compound selected from the group consisting of soluble salts, soaps, amines, nonionic and anionic surfactants, acids, and bases or mixtures thereof.

Silica acrylate resins are known in the art.

The silyl acrylate of the present invention can generally be represented by the following formula:

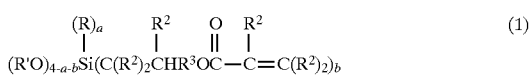

Acrylic monomer of the formula:

is added to the silyl acrylate to form the resins employed in present invention.

In both of the above formulas, each R independently is a $C_{(1-13)}$ monovalent organic radical, each $R^1$ is independently a $C_{(1-8)}$ alkyl radical, $R^2$ is selected from hydrogen, R or mixtures thereof, each $R^3$ is independently a $C_{(1-8)}$ alkylene radical, each $R^4$ is independently a mono- or polyvalent organic radical, a is a whole number from 0 to 2 inclusive, b is an integer from 1 to 3, the sum of a+b is equal to 1–3, and n is an integer from 1 to 6 inclusive.

If desired, a UV photoinitiator can be added to the resulting mixture of the silyl acrylate and acrylic monomer.

In formula (1), each R is more particularly a $C_{(1-8)}$ alkyl, such as methyl, ethyl, propyl, butyl, and the like; an aryl radical or halogenated aryl radical, for example, phenyl, tolyl, xylyl, naphthyl, chlorophenyl, and the like; each $R^1$ is more particularly, for example, any of the $C_{(1-8)}$ alkyl radicals included within the definition of R; and radicals included within the definition of each of $R^2$ are hydrogen and each of the radicals included within the definition of R. $R^3$ is more particularly a divalent alkylene radical, for example, methylene, ethylene, trimethylene, tetramethylene, and the like. Divalent organic radicals included within the definition of $R^4$ are $R^3$ radicals, branched $C_{(2-8)}$alkylene radicals, branched halogenated $C_{2-8)}$ alkylene radicals, branched hydroxylated $C_{(2-8)}$ alkylene radicals, branched hydroxylated $C_{(2-8)}$ alkylene radicals, branched acrylate radicals, $C_{6-13)}$ arylene radicals, for example, phenylone, tolylene, naphthylene, and the like, halogenated $C_{(6-13)}$ arylene radicals, and the like.

Formula (2) includes polyfunctional acrylate monomers, for example, diacrylates of the formulas:

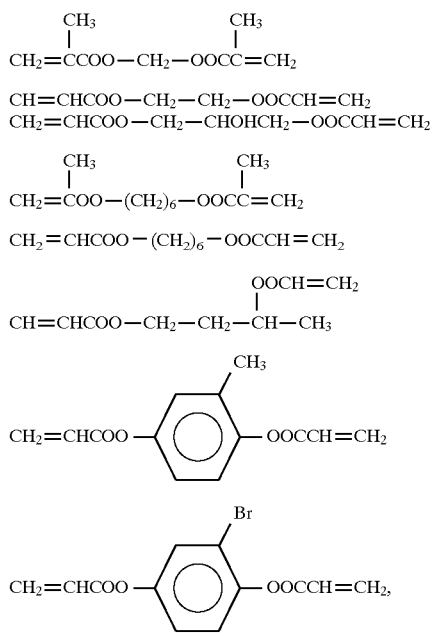

and the like, and triacrylates of the formulas:

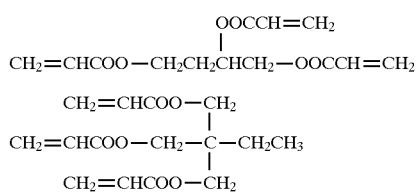

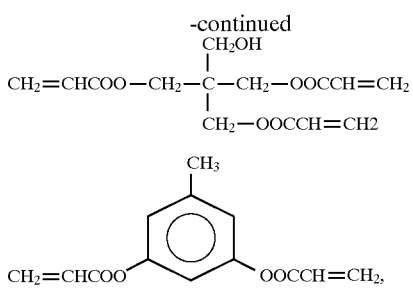

and the like, and tetraacrylates of the formulas:

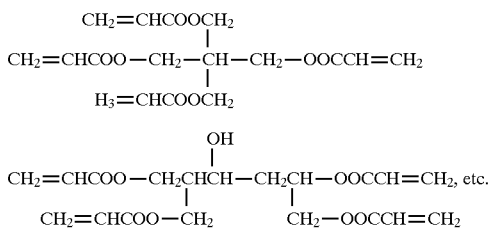

Included within the silyl acrylates of formula (1) are compounds having the formulas:

$CH_2=CCH_3CO_2—CH_2CH_2—Si(OCH_2CH_3)_3$,
$CH_2=CHCO_2—CH_2CH_2—Si(OCH_3)_3$,
$CH_2=CCH_3CO_2—CH_2CH_2CH_2—Si(OCH_2CH_3)_3$,
$CH_2=CHCO_2—CH_2CH_2—Si(OCH_2CH_3)$,
$CH_2=CCH_3CO_2—CH_2CH_2CH_2—Si(OCH_3)_3$,
$CH_2=CHCO_2—CH_2CH_2CH2—Si(OCH_3)_3$,
$CH_2=CCH_3CO_2—CH_2CH_2CH_2—Si(OCH_2CH_3)_3$,
$CH_2=CHCO_2—CH_2CH_2CH_2—Si(OCH_2CH_3)_3$,
$CH_2=CCH_3CO_2—CH_2CH_2CH_2CH_2—Si(OCH_3)_3$,
$CH_2=CHCO_2—CH_2CH_2CH_2CH_2—Si(OCH_3)_3$,
$CH_2=CCH_3CO_2—CH_2CH_2CH_2C—H_2\text{-}Si(OCH_2CH_3)_3$,
$CH_2=CHCO_2—CH_2CH_2CH_2CH_2—Si(OCH_2CH_3)_3$, and the like.

Colloidal silica, another of the ingredients of the hardcoat composition of the present invention, is a dispersion of submicron-sized silica ($SiO_2$) particles in an aqueous or other solvent medium. The $SiO_2$ provides quadri-functional (Q) silicon atoms and adds hardness to the coatings. When mixed with tri-functional (T) silicon-containing acrylates, TQ mixtures are formed.

Dispersions of colloidal silica are available from chemical manufacturers such as DuPont and Nalco Chemical Company. Colloidal silica is available in either acidic or basic form. However, for purposes of the present invention it is preferable that the acidic form be utilized. It has been found that superior hardcoat properties can be achieved with acidic colloidal silica (i.e., dispersions with low sodium content). Alkaline colloidal silica also may be converted to acidic colloidal silica with additions of acids such as HCl or $H_2SO_4$ along with high agitation.

Nalcoag 1034A® is an example of a satisfactory colloidal silica for use in these coating compositions, available from Nalco Chemical Company, Chicago, Ill. Nalcoag 1034A® is a high purity, acidic pH aqueous colloidal silica dispersion having a low $Na_2O$ content, a pH of approximately 3.1 and an $SiO_2$ content of approximately 34 percent by weight. In the examples given below, the weight in grams or parts by weight of the colloidal silica includes its aqueous medium. Thus, for example, 520 grams of Nalcoag 1034A® colloidal silica represents, approximately, 177 grams of $SiO_2$ by weight. It should be noted, however, that the aqueous medium is al convenient way of handling the colloidal silica and does not form a necessary part of the hardcoat compositions of the present invention. However, since water is required for the SiOR hydrolysis, some water must be added to non-aqueous colloidal silica.

The term colloidal silica is intended to represent a wide variety of finely divided SiO2 forms which can be utilized to form the hardcoat compositions of the present invention without the necessity of undue experimentation. Further description can be found in U.S. Pat. No. 4,027,073, which is herein incorporated by reference.

The coating compositions of the present invention may be formulated without any additional curing agent. If desired, the coating compositions may be cured by exposure to electron-beam (EB) radiation. In the case of exposure to EB, it is desirable to have a thin coating. Preferably this coating is less than 2.5 cm (1 in.) in thickness, and preferably less than 25 micron. (1/1000th in.)

This material may be further formulated to contain curing agents. One such curing agent is a photoinitiator. The composition may than be cured by exposure to a UV light source. It is desirable to have a coating of about 2500 microns (1/10 in.) in thickness, and preferably less than about 25 microns (1/1000th in.) in thickness.

Although the coating compositions may contain only one of said polyfunctional acrylate monomers, preferred coating compositions contain a mixture of two or more polyfunctional monomers, preferably a diacrylate and a higher functional acrylate. In addition, minor amounts of monoacrylate can be used in particular instances. Further, the UV curable compositions of the present invention can contain nonacrylic UV curable aliphatically unsaturated organic monomers in amounts up to 50% by weight of the UV curable hardcoat compositions which include, for example, such materials as N-vinyl pyrrolidone, styrene, vinyl ether/maleate blends, tri- and tetra-functional acrylates and the like.

Coating compositions which contain a mixture of diacrylates and higher functional acrylates, have a ratio of diacrylates to higher functional acrylate is general from about 0.5:99 to about 99:0.5 and most preferably from about 1:99 to about 99:1. Exemplary mixtures of diacrylate and higher functional acrylates include mixtures of hexanediol diacrylate with trimethylolpropane triacrylate, hexanediol diacrylate with pentaerythritol triacrylate, hexanediol diacrylate with dipenta-erythritol-pentaacrylate, diethyleneglycol diacrylate with pentaerythritol triacrylate, and diethyleneglycol diacrylate with trimethylolpropane triacrylate. Coatings containing the photoreaction product of two polyfunctional acrylate monomers are preferred.

The coatings may likewise contain the ultraviolet light reaction product of a single polyfunctional acrylate monomer. Preferably, both a diacrylate and a higher functional acrylate are used.

One preferred high functional acrylate is trimethylolpropane triacrylate. Compositions comprising between 0.2 and 99 parts by weight trimethylolpropane triacrylate, before or after curing are preferred. Cured compositions comprising from about 2 to about 99 parts by weight are also preferred.

The photocurable coating compositions also contain a photosensitizing amount of photointiator, i.e., an amount affective to effect the photocure, of the coating composition. Generally, this amount is from about 0.01 to about 15 parts by weight, and preferably from about 0.1 to about 10 parts by weight based upon the total of colloidal silica, hydrolysis and condensation reaction product of a silyl acrylate of formula (1) and an acrylate monomer of formula (2).

As shown in U.S. Pat. No. 4,491,508, certain blends of ketone-type and hindered amine type materials are photoinitiators effective for crosslinking the above described coating compositions in air to form suitable hard coatings upon exposure to UV radiation. That patent is herein incorporated by reference.

One ketone-type photoinitiator used is α,α-diethoxyacetophenone. A preferred photoinitiator is methylbenzoylformate, having a molecular weight of 164, and used at 5 parts by weight or more. At 5.7 parts by weight methylbenzoylformate, 50 mole percent more photoinitiator is available in the formulations than the mole percent available then when using 5 parts by weight of the higher molecular weight ≠0 α-diethoxyacetophenone. Methylbenzoylformate is available as Vicure 55® from Akzo Chemicals, Inc., Chicago, Ill. According to an embodiment of the present invention, 35 millimoles of photoinitiator per 100 g of coating is used. A wider range of substrates can be coated using a higher level of photoinitiator. The photoinitiators break down to free radicals when exposed to UV light, The free radicals then open the double bonds between carbon atoms in acrylate groups.

The amount of photoinitiator added to the compositions is greater than 5 parts by weight based on 100 parts by weight of non-volatile components; colloidal silica, hydrolysis and condensation reaction product of a silyl acrylate of formula (1) and an acrylate monomer of formula (2). Preferably, between 5 and about 12 parts by weight are used when the photoinitiator is methylbenzoylformate. More preferably, between about 6 and about 7% by weight methylbenzoylformate is added.

The use of greater amounts of photoinitiator produces hardcoats having shorter cure times. These hardcoats are particularly useful and desired for coating films at high rates. Current film application cure rates range from about 30 to 100 feet per minute (fpm). However, according to the present invention, higher cure rates are obtainable since the high amounts of photoinitiator enable a faster cure. Film coatings comprising the hardcoats of the present invention can be cured by passing under a UV source at rates of 50 to as high as 500 feet per minute if enough light sources are used. At such high rates and under similar conditions, the hardcoats of the prior art would remain less cured as evidenced by softer coatings.

The coating compositions of the Instant invention may also optionally contain UV absorbers or stabilizers such as resorcinol monobenzoate, 2-methyl resorcinol dibenzoate, and the like. The stabilizers can be present in an amount, based upon the weight of the coating compositions, exclusive of any additional solvent which may optionally be present, from about 0.1 to 25 parts by weight, preferably from about 3 to about 18 parts by weight based on colloidal silica, hydrolysis and condensation reaction product of a silyl acrylate of formula (1) and an acrylate monomer of formula (2). The UV curable coating composition can contain from about 1 to about 25 parts by weight of stabilizers based on colloidal silica, hydrolysis and condensation reaction product of a silyl acrylate of formula (1) and an acrylate monomer of formula (2).

Suitable solvents include any water-miscible alcohol or water-solvent azeotrope. Examples of solvents include isopropyl alcohol (IPA). 4-methoxypropanol, n-butanol, 2-butanol, ethanol and the like.

Suitable compounds that may be added to the curable compositions can include solvable salts, soaps, amines, nonionic and anionic surfactants, acids, bases and the like. Compounds for use in the current invention includes any compound that prevents the formation of gel in the coating compositions of the current invention. One skilled in the art would recognize that any such compound can be used, as long as it does not precipitate the colloidal silica, and as long as properties such as cure speed, hardness, weatherability, and substrate protection are maintained at suitable levels. One preferred compound is sodium acetate.

Examples of soluble salts include stannous chloride, sodium acetate, sodium bicarbonate, tetrabutyl ammonium acetate, tetrabutyl ammonium bromide and the like. Examples of soaps contemplated for use in the present invention include calciumneodecanoate, stannous octate, zinc octoate and the like. Amines contemplated for use in the present invention include triethylamine. Examples of non-ionic and anionic surfactants include linear secondary alcohols having from about $C_{11}$ to about $C_{18}$ reacted with polyethyleneoxideproplencoxide $(EOPO)_z$, where z is from about 8–10; nonylphenol, octyl phenols having from about 3 to about 10 EO; alkylphenol$(EO)_{70}$H: secondary alcohols having from about $C_{11}$ to about $C_{18}$ with $(EO)_xH$ wherein x is from about 2 to about 10; $HO(EO)_x(PO)_y(EO)_xOH$, wherein x is from about 2 to about 100 and y is from about 2 to about 100; ammoniumlaurylsulfonate; and the like. Examples of acids contemplated for use in the current invention include hydrochloric acid, and the like. Specific bases can include triethylamine and the like. One skilled in the art would recognize they are merely representative examples, and other compounds may be used, as well as a combination of those listed above.

Compounds for use in the current invention include any compound that prevents the formation of gel in the coating compositions of the current invention.

The amount of compound present in the compositions of the present invention is an amount sufficient to maintain the viscosity of the mixture at a level such that when diluted in a suitable solvent, no undissolved material remains.

The coating compositions of the present invention may also optionally contain various flattening agents, surface active ,agents, thixotropic agents, UV light stabilizers, hindered amine light stabilizers (HALS) and dyes. All of these additives are well known in the art and do not require extensive discussions. Therefore, only a limited number will be referred to, is being understood that any of these compounds can be used so long as they do not deleteriously affect the photocuring of the coating compositions and do not adversely affect the non-opaque character of the coating.

The various surface-active agents, including anionic, cationic and nonionic surface-active agents are described In Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference. Also, flow control and leveling additives such as BYK300® and BYK310® from BYK Chemie, Wallingford, Conn., may be added in amounts of from 0.01 to 6 parts by weight based on colloidal silica, hydrolysis and condensation reaction product of a silyl acrylate of formula (1) and an acrylate monomer of formula (2).

Generally the method of the current invention is run in an atmosphere that is substantially oxygen free. What is meant by substantially oxygen free is that the atmosphere is generally less than 15% oxygen and preferably less than 10%. Still more preferably the atmosphere is less than 6% oxygen.

It is therefore recognized the compounds can be added to the silicon acrylate curable coating composition at any time during the method of the present invention. The compounds may be added before or after the T/Q resin blend is prepared. One skilled in the art would also recognize that further formulations of the above blends may be necessary or desirable.

EXAMPLE 1

A master batch of hydrolysate was made as follows:

Methacryloxypropyltrimethoxysilane (13.0 parts) was hydrolysed in acidic colloidal silica (Nalco 1034A, 86.9 parts), para methoxyphenol (0.07 parts), and isopropyl alcohol (IPA, 464 parts), and stripped to remove about 73% of the water and IPA. This material was 24.2% non-volatile by weight, and it served as the silicone portion for all of the reactions described in Table 1:

TABLE 1

| EX-AMPLE # | COMPOUND | AMOUNT (parts per million (ppm) of stripped product) | AMOUNT g/161.2 g hydrolysate at 24.2% | VISCOSITY[1,2] AT 25° C. CENTISTOKES (CSTKS) |
|---|---|---|---|---|
| 1 | Control | 0 | 0 | GEL |
| 2 | Stannous chloride | 133 | 0.0100 | 40.5 |
| 3 | Sodium Acetate | 213 | 0.0160 | 40.1 |
| 4 | Sodium Acetate | 52 | 0.00396 | 41.5 |
| 5 | Sodium Acetate | 40 | 0.00297 | 41.5 |
| 6 | Sodium Acetate | 30 | 0.00205 | 247 |
| 7 | Sodium Acetate | 100 | 0.00733 | 39.5 |
| 8 | Sodium Bicarbonate | 110 | 0.0082 | 41.9 |
| 9 | Tetrabutyl-ammonium Acetate | 133 | 0.01000 | 41.4 |
| 10 | Tetrabutyl-ammonium Bromide | 200 | 0.0150 | low |
| 11 | Calcium Neodecanoate | 213 | 0.0160 | 41.6 |
| 12 | Stannous Octoate | 533 | 0.0400 | low |
| 13 | Zinc Octoate | 400 | 0.0300 | low |
| 14 | Ionic Surfactant (WITCOLATE AM ®) | 100 | 0.0074 | 213.7 |
| 15 | Ionic Surfactant (WITCOLATE AM ®) | 400 | 0.0292 | 91.8 |
| 16 | Nonionic Surfactant (Tergitol 15-S-9 ®) | 500 | 0.036 | 84.6 |
| 17 | HCl | 487 | 0.037 | low |
| 18 | Triethylamine | 32 | 0.0024 | low |
| 19 | Triethylamine | 10 | 0.00076 | low |
| 20 | Triethylamine | 100 | 0.0076 | low |
| 21 | Triethylamlne | 4 | 0.00032 | moderate |

[1]Strip conducted under nitrogen
[2]Test performed using Cannon-Fensky Tube @ 25 C.
Low = approx. 35–74 CSTKS; Moderate = approx. 75–100,000; GEL = approx. > > 100,000 CSTKS

EXAMPLES 2–21

As can be seen in Table 1, various compounds, in various amounts were added to the hydrolysate of Example 1. Both the type of compound and the amount added affects the viscosity of the product. This demonstrates the synergistic combination of silyl acrylate and colloidal silica with the compounds selected.

EXAMPLES 22–27

Sodium Acetate was added at various levels, to the hydrolysate made in accordance with Example 1. The sodium acetate was added at different points during the formation of the product, demonstrating that order of addition is not critical. The results can be see in Table 2.

TABLE 2

| EX-AMPLE | COMPOUND | LEVEL (PPM) PER PRODUCT) | LEVEL (g/161.2 g hydro-lysate @ 24.2%) | VISCOSITY[1,2] | COMMENT |
|---|---|---|---|---|---|
| 22 | NaACETATE | 213 | 0.016 | 40.1 | Partial Strip before adding NaOAc (213 PPM/Finished Product) |
| 23 | NaACTATE | 200 | 0.015 | 45.6 | No strip before adding NaOAc (200 PPM/finished product) |
| 24 | NaACETATE | 100 | 0.0074 | 38 | Partial strip before adding NaOAc (100 PPM/finished product |
| 25 | NaACETATE | 100 | 0.0074 | 49 | No strip before adding NaOAc (100 PPM/finished product) |
| 26 | NaACETATE | 200 | 0.016 | 38.5 | Sequential Add - 100 PPM NaOAc Immediately before strip, and 100 PPM after some strip time. |
| 27 | Control | 0 | 0 | GEL | |

[1,2]Test performed as in Table 1

Although the present invention has been described in terms of preferred embodiments, it will be appreciated by those skilled in the art that other embodiments and examples are within the contemplation of the present invention and may be made without departing from the spirit and scope of the invention as defined in the appended claims.

What is claimed is:

1. A method for making a silica acrylate curable coating composition comprising the steps of:
    (a) providing a silica acrylate curable coating composition; and
    (b) adding thereto a gel preventing compound selected from the group consisting of soluble soaps, acids, bases and mixtures thereof to said silica acrylate curable coating composition before stripping;
whereby said silica acrylate curable coating composition is gel free.

2. The method of claim 1 wherein said coating composition contains a mixture of diacrylates and high functional acrylates said mixture having a ratio of diacrylate to high functional acrylate of from 0.5 to 99 to about 99 to 0.5.

3. The method of claim 2 wherein said gel preventing compound is sodium acetate.

4. The method of claim 1 further comprising the step of stripping solvent from said coating composition.

5. The method of claim 1 wherein said method is conducted in an environment substantially oxygen free.

6. The method of claim 5 wherein said substantially oxygen free environment has an oxygen level less than 15%.

7. The method of claim 6 wherein said oxygen level is less than 6%.

8. The method of claim 1 further comprising the step of adding a polymerization inhibitor.

9. The method of claim 8 wherein said polymerization inhibitor comprises paramethoxyphenol.

10. The method of claim 7 comprising adding paramethoxyphenol.

11. The method of claim 10 further comprising the step of stripping solvent from said coating composition.

12. The method of claim 11 wherein said gel preventing compound is sodium acetate.

13. The method of claim 12 wherein said coating composition contains a mixture of diacrylates and high functional acrylates said mixture having a ratio of diacrylate to high functional acrylate of from 0.5 to 99 to about 99 to 0.5.

14. A method for making a silica acrylate photocurable hard coat composition comprising the steps of:
    (a) providing a photocurable silica acrylate hard coat composition; and
    (b) adding thereto a gel preventing compound selected from the group consisting of soluble soaps, acids, bases and mixtures thereof to said photocurable silica acrylate hard coat composition before stripping,
whereby said photocurable silica acrylate curable coating composition is gel free.

* * * * *